(12) United States Patent
Palmer et al.

(10) Patent No.: US 7,106,101 B2
(45) Date of Patent: Sep. 12, 2006

(54) FUNCTIONAL PATHWAY CONFIGURATION AT A SYSTEM/IC INTERFACE

(75) Inventors: Mark Palmer, Phoenix, AZ (US); Steven Eric Schlanger, Flagstaff, AZ (US)

(73) Assignees: Microchip Technology Inc., Chandler, AZ (US); Aegis Technologies LLC, Flagstaff, AZ (US)

( * ) Notice: Subject to any disclaimer, the term of this patent is extended or adjusted under 35 U.S.C. 154(b) by 1051 days.

(21) Appl. No.: 09/862,080

(22) Filed: May 21, 2001

(65) Prior Publication Data

US 2003/0086419 A1    May 8, 2003

(51) Int. Cl.
*H03K 19/0175* (2006.01)
(52) U.S. Cl. .......................................... 326/63; 326/37
(58) Field of Classification Search ................ 710/100; 359/172; 370/359, 360, 386, 392; 326/37, 326/62, 63
See application file for complete search history.

(56) References Cited

U.S. PATENT DOCUMENTS

2002/0176138 A1*  11/2002  Schlanger ................... 359/172
2004/0225766 A1*  11/2004  Ellison et al. ............... 710/100

* cited by examiner

*Primary Examiner*—Phirin Sam
(74) *Attorney, Agent, or Firm*—Baker Botts L.L.P.

(57) ABSTRACT

The present invention relates generally to functional pathway configurations at the interfaces between integrated circuits (ICs) and the circuit assemblies with which the ICs communicate. More particularly, the present invention relates generally to the functional pathway configuration at the interface between a semiconductor device (e.g., computer chips like microcontrollers, microprocessors, application specific integrated circuits (ASIC), programmable gate arrays (PGA) and other devices and/or combinations thereof) and the circuitry of a system including the chip. Even more particularly, the present invention relates to a 14-pin microcontroller functional pathway configuration for the interface between the microcontroller and a system in which the microcontroller is embedded to support infrared communications.

9 Claims, 2 Drawing Sheets

FUNCTIONAL PATHWAY CONFIGURATION AT A SYSTEM/IC INTERFACE

RELATED APPLICATION

The application is related to co-pending application Ser. No. 09/862,079, entitled "Infrared Encoder/Decoder Having Hardware and Software Data Rate Selection" by Steven Eric Schlanger, filed May. 21, 2001, and is incorporated herein by reference for all purposes.

FIELD OF THE INVENTION

The present invention relates generally to functional pathway configurations at the interfaces between integrated circuits (ICs) and the circuit assemblies with which the ICs communicate. More particularly, the present invention relates generally to the functional pathway configuration at the interface between a semiconductor chip including an IC (e.g., computer chips like microcontrollers, microprocessors, application specific integrated circuits (ASIC), programmable gate arrays (PGA) and other devices and/or combinations thereof) and the circuitry of a system including the chip. Even more particularly, the present invention relates to a 14-pin microcontroller functional pathway configuration for the interface between the microcontroller and a system in which the microcontroller is embedded to support infrared communications. Advantageously, the microcontroller comprises an infrared encoder/decoder disposed between an IC controller including a UART and an IrDA optical transceiver.

BACKGROUND OF THE INVENTION

The electronics industry is generally divided into two main segments: application products companies and semiconductor companies. The application products companies segment includes the companies that design, manufacture, and sell the wide variety of semiconductor-based goods. The semiconductor companies segment includes integrated circuit (IC) design companies (i.e., fabless companies which may design and/or sell semiconductor chips), foundries (i.e., companies that manufacture chips for others), and partially or fully integrated companies that may design, manufacture, package and/or market chips to application products companies.

There is a large range of semiconductor-based goods available across a broad spectrum of applications, i.e., goods which include one or more semiconductor devices, in applications ranging from manufactured printed circuit boards to consumer electronic devices (stereos, computers, toasters, microwave ovens, etc.) and automobiles (which, for example, include semiconductor devices in fuel injection, anti-lock brake, power windows and other on-board systems). Thus, as one might imagine, there also are a wide variety of semiconductor devices available to meet the various requirements of such products and applications.

Perhaps the two most familiar types of semiconductor devices today are microcontroller and microprocessor computer chips. Microcontrollers, which are the "brains" of a broad range of consumer and industrial applications, differ from microprocessors primarily from the standpoint of the end-user consumer. Typically, consumers concern themselves with the type of microprocessor in a product because the consumers will perceive different performance characteristics or results depending upon the type of microprocessor a product uses (e.g., personal computer applications). Microcontrollers, on the other hand, typically are embedded in an application system and do not enter into the equation when end-user consumers are making purchasing decisions.

Typically, semiconductor companies who offer microcontrollers to products companies provide the microcontroller with a set of features and capabilities appropriate for a particular product or application. Thus, microcontrollers may have a broad range of features and capabilities, and semiconductor companies typically tend to offer their customers a wide range of microcontroller products to meet their customers' needs. For example, a semiconductor company may offer a family of products including a feature-rich "high-end" product (e.g., for automobile applications) and one or more "low-end" products including fewer features (e.g., for household appliance applications).

But while an end-user consumer, concerned only with whether a product works, might be indifferent as to the microcontroller device included in a product, the product designer and manufacturer certainly are not. Product companies generally will expend great efforts to ensure that their products work properly and that consumers receive value and remain satisfied. Thus, product companies tend to select microcontrollers for use in an application based on their features and capabilities, not to mention costs and other factors.

In view of such circumstances, there tends to be vigorous competition amongst semiconductor companies for microcontroller "design wins." In other words, at the design stage, when a products company is designing a product for a given application, semiconductor companies compete for having their microcontroller included in the product. Once a product company establishes a design and sets the functional pathway configuration for the interface between a microcontroller and the system in which the microcontroller is embedded, the product company is less likely to change the configuration to accommodate another microcontroller having a different functional pathway configuration. Such configuration changes typically result in increased costs for the product company due to the system in which the microcontroller is embedded having to be re-designed.

While there are a number of factors involved in any decision to award a design win, one such factor comprises a semiconductor company's product "roadmap." Over time, end-user consumers generally tend to favor future generation consumer products having increased features at lower costs. Accordingly, product companies evaluating microcontroller products of two or more semiconductor companies today will consider whether the particular solutions being offered now will allow them to migrate easily from a basic first generation microcontroller to an enhanced future generation microcontroller having increased capabilities and features. Such migration—without the products company incurring extensive system re-design costs—in general is necessary if the products company is to offer the future generation products that consumers typically demand.

Accordingly, there remains a need for a simple and convenient functional pathway configuration for the interface between a microcontroller and the system in which the microcontroller is embedded, e.g., that tends to promote increased performance with lower costs.

SUMMARY OF THE INVENTION

The present invention may address one or more of the problems set forth above. Certain possible aspects of the present invention are set forth below as examples. It should be understood that such aspects are presented simply to provide the reader with a brief summary of certain forms the invention might take, and that these aspects are not intended to limit the scope of the invention. Indeed, the invention may encompass a variety of aspects that may not be set forth below.

In one embodiment of the present invention, a functional pathway configuration at the interface between an integrated circuit (IC) and the circuit assembly with which the IC communicates is provided. In a further embodiment, a functional pathway configuration at the interface between a semiconductor chip including an IC (e.g., computer chips like microcontrollers and microprocessors) and the circuitry of a system including the chip is provided.

In general, IR communication is a wireless, two-way data connection that uses infrared light. The infrared light may be generated, for example, by transceiver signaling technology. IrDA is an open standard for infrared communication. IrDA 1.0 specifies a maximum communication speed of 115 k bps and IrDA 1.1 specifies a maximum communication speed of 4 MHz. The Infrared Data Association (IrDA) is an organization which promotes an IR standard for interoperability of wireless IR links between various manufacturers devices. The IrDA defines a set of specifications, or protocol stack, that provides for the establishment and maintenance of an IR link so that error free communication is possible.

In accordance with the present invention, in one embodiment a system including the IC may comprise an IR encoder/decoder disposed between an IrDA optical transceiver (e.g., the HSDL-1001, available from Agilent Technologies, Inc.) and a controller (e.g., a microcontroller, microprocessor or other computer on a chip) including a UART. Typically, the IR encoder/decoder receives data from the controller UART, encodes or modulates the data, and outputs electrical pulses to the transceiver. The IR encoder/decoder also receives electrical pulses from the IR transceiver, decodes or demodulates the pulses, and transmits data to the controller UART. Thus, in still a further embodiment, a microcontroller functional pathway configuration is provided for the interface between the microcontroller and a system in which the microcontroller is embedded to support infrared (IR) communications.

In one aspect, the present invention comprises an integrated circuit (IC) including a plurality of connections or "pins." Advantageously, at least one pin comprises a power connection, at least one pin comprises a ground connection, and the remaining pins are input, output or input/output (I/O) connections, wherein each pin may have one or more associated functions. The pins may be analog, digital, or mixed-signal (can be analog or digital). Some pins advantageously are multiplexed with one or more alternate functions for the peripheral features on the microcontroller so that in general when a peripheral is enabled that particular pin may not be used, for example, as a general purpose I/O pin.

In one embodiment, an integrated circuit (IC) in accordance with the present invention advantageously includes at least fourteen connections or pins. Each pin may be adapted and described according to the function(s) dedicated to the connection, so that all or a portion of the connections together define a functional pathway configuration at the interface between the microcontroller and the system in which the microcontroller may be embedded. Alternately, in another embodiment, the present invention comprises a system for receiving such an IC.

In accordance with the present invention, and depending upon the particular application involved, the IC with which a system interfaces may comprise a packaged IC. Examples of types of packaging include a dual in-line package (DIP), which may comprise molded plastic dual in-line package (PDIP) or ceramic dual in-line package (CERDIP); micro lead frame (MLF); pin grid arrays (PGAs); ball grid arrays (BGAs); quad packages; thin packages, such as flat packs (FPs), thin small outline packages (TSOPs), small outline IC (SOIC) or ultrathin packages (UTPs); lead on chip (LOC) packages; chip on board (COB) packages, in which the chip is bonded directly to a printed-circuit board (PCB); and others. However, for the sake of clarity and convenience only, and without limitation as to the scope of the present invention, reference will be made herein primarily to PDIP or CERDIP ICs.

Table 1 describes an exemplary embodiment including the various functions that the IC may perform, with the functions arranged by pin dedication. Of course the exact pin and function names used in any particular embodiment or application may vary depending upon the naming convention(s) selected. Table 1 is directed to an exemplary embodiment comprising a 14-pin integrated circuit package microcontroller. The embodiment described in Table 1 in general may be suited for applications involving devices having IR ports allowing for short range wireless connection to other IR-enabled devices. Examples of such applications include consumer products, such as digital cameras and camcorders; computers and peripheral products, such as notebook and desktop PCs, handheld PCs/PDAs/organizers, printers and adapters; telecommunication products, such as cellular phones, pagers, and wireless LANs; industrial applications, such as application specific PCs and peripherals, and retail devices; and automotive applications, such as those involving fleet management.

TABLE 1

| PIN NAME | PIN TYPE | BUFFER TYPE | DESCRIPTION |
| --- | --- | --- | --- |
| VDD | — | P | Positive supply for logic and I/O pins |
| OSC1/CLKIN | INPUT | CMOS/ST | Oscillator crystal input/external clock source input (ST in EXTER mode only) |
| OSC2 | OUTPUT | — | Oscillator crystal output |
| RESET | INPUT | ST | Resets the device |
| RXIR | INPUT | ST | Asynchronous receive from IrDA transceiver |
| TXIR | OUTPUT | — | Asynchronous transmit to IrDA transceiver |
| MODE | INPUT | TTL | Selects the device mode (data/command) for software or hardware baud rate selection |

TABLE 1-continued

| PIN NAME | PIN TYPE | BUFFER TYPE | DESCRIPTION |
| --- | --- | --- | --- |
| BAUD2 | INPUT | TTL | Baud rate selection |
| BAUD1 | INPUT | TTL | Baud rate selection |
| BAUD0 | INPUT | TTL | Baud rate selection |
| RX | OUTPUT | — | Asynchronous transmit to controller UART |
| TX | INPUT | TTL | Asynchronous receive from controller UART |
| EN | INPUT | — | Device enable |
| VSS | — | P | Ground reference for logic and I/O pins |

Legend: TTL = TTL compatible input; I = input; P = power; ST = Schmitt trigger input with CMOS levels; O = output.

Each of the pins advantageously is adapted with circuitry, and/or a programmable device (e.g., microcontrollers, microprocessors, application specific integrated circuits (ASIC), programmable gate arrays (PGA) and other devices and/or combinations thereof) is programmed with firmware, to be dedicated to the functions as listed in Table 1. Of course the exact form of the circuitry and/or firmware used to create such functionality and adapt such pins may vary depending upon the particular application involved. Without limitation as to the scope of the present invention, for the sake of clarity and convenience reference will be made herein to a firmware embodiment of the present invention.

BRIEF DESCRIPTION OF THE DRAWINGS

Further objects and advantages of the present invention will become apparent upon reading the following detailed description and upon referring to the accompanying drawings in which.

Figure 1:
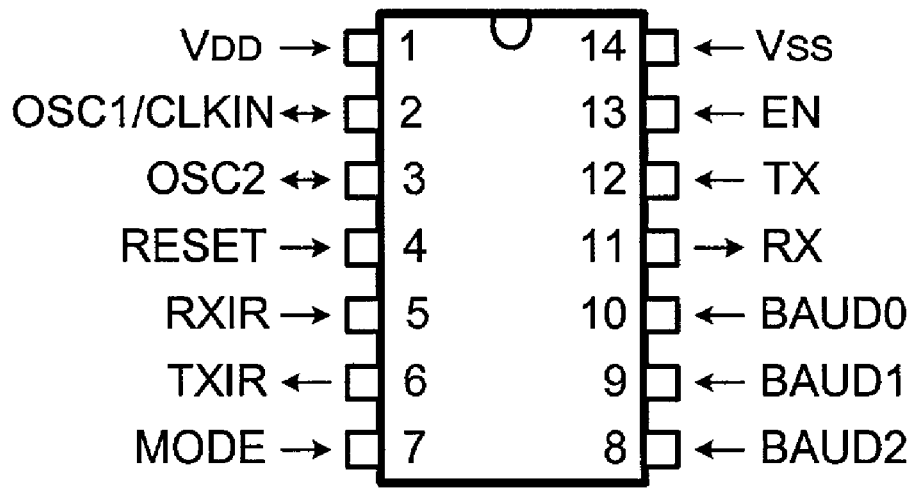
FIG. 1 is a diagram illustrating an exemplary embodiment of a 14-pin microcontroller including a functional pathway configuration for the interface between the microcontroller and a system in which the microcontroller is embedded, in accordance with the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

The description below illustrates embodiments of the present invention. For the sake of clarity, not all features of an actual implementation of the present invention are described in this specification. It should be appreciated that in connection with developing any actual embodiment of the present invention many application-specific decisions must be made to achieve specific goals, which may vary from one application to another. Further, it should be appreciated that any such development effort might be complex and time-consuming, but would still be routine for those of ordinary skill in the art having the benefit of this disclosure.

For the sake of clarity and convenience, aspects of the present invention are described in the context of various embodiments typically used in applications generally involving IR communications, examples of which are set forth herein. However, the present invention may also be useful in a wide variety of other wireless applications, such radio frequency, sound, etc.

Also, although the present invention may be used with discrete components, microprocessors, microcontrollers, application specific integrated circuits (ASIC), programmable gate arrays (PGA) and other devices and/or combinations thereof, for the sake of clarity and convenience reference is made herein to microcontrollers. One of ordinary skill in the art of electronics would readily appreciate and be able to contemplate other and further applications of the present invention by having the benefit of this disclosure.

Turning now to the drawings, and by way of general illustration, as shown in FIG. 1, exemplary embodiments in accordance with the present invention comprise a plastic dual in-line package (PDIP) or ceramic dual in-line package (CERDIP) 14 pin microcontroller having functional pathway configurations for the interface between the microcontroller and a system (see FIG. 3) in which the microcontroller is embedded. A functional block diagram of the 14-pin microcontroller is shown in FIG. 2.

Figure 2:
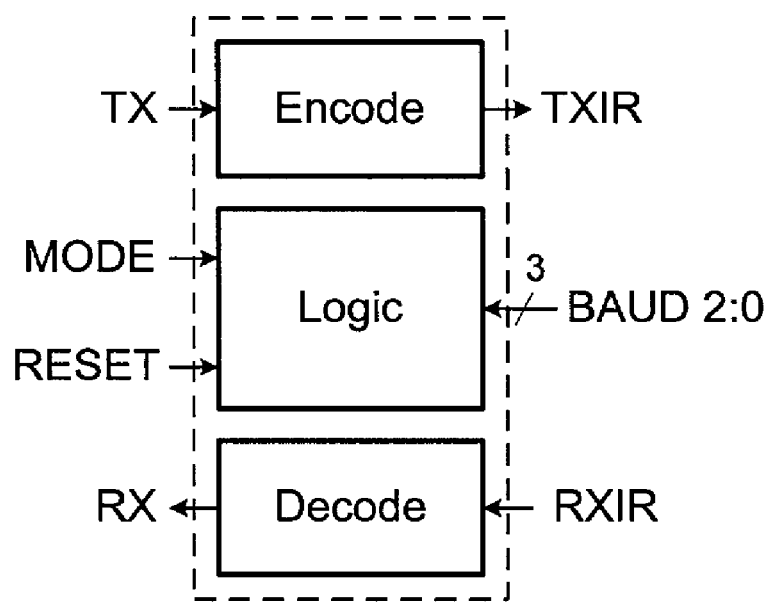
FIG. 2 is a functional block diagram illustrating the exemplary embodiment of a 14-pin microcontroller shown in FIG. 1 as embedded within an exemplary system, in accordance with the present invention.
Figure 3:
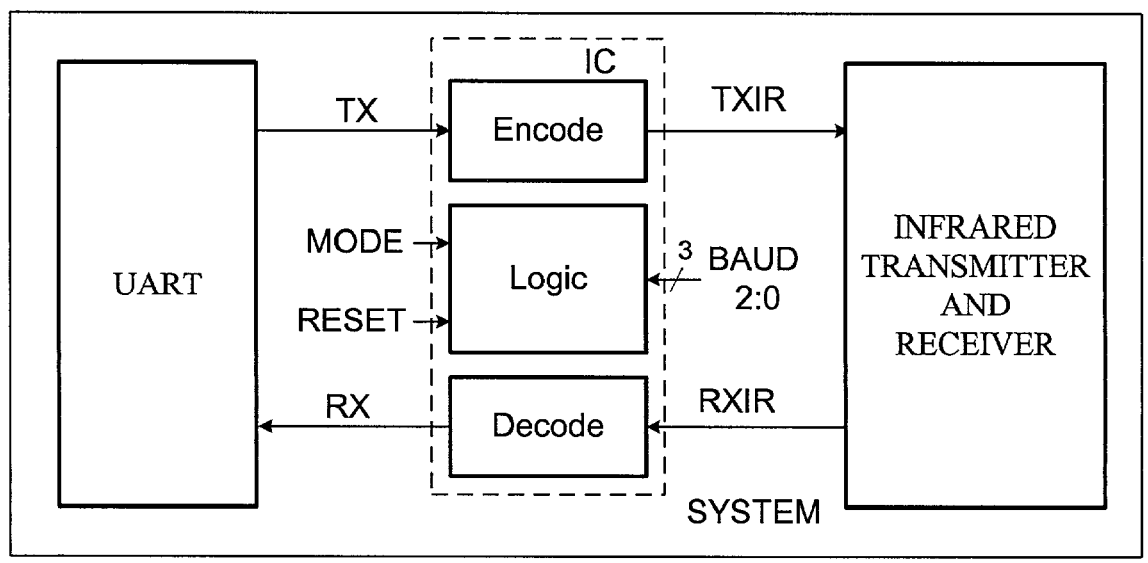
FIG. 3 is a block diagram illustrating an exemplary system comprising an embedded microcontroller including a functional pathway configuration for the interface between the microcontroller and the system, in accordance with the present invention.

As shown in FIGS. 1, 2 and 3, the microcontroller is in general functionally configured with a transmit/receive function pair on each side of the vertical axis along the length of the package (as opposed to across the package). A configuration including such a feature has as an advantage an increased ability to simplify routing for system board design and microcontroller placement therein. Such advantage may prove beneficial in some cases, e.g., to an applications engineer in situations where partitioning of the printed circuit board in which the microcontroller is to be mounted would prove to be advantageous. In the embodiment shown, the locations of the TX and RX pins and the TXIR and RXIR pins demonstrate this transmit/receive function pair placement. A transmit/receive function pair (e.g., TX and RX) advantageously is on the same port of the microcontroller, and the two pairs are on different ports. Thus, as shown in the embodiment of FIG. 1, TX and RX are on port A and TXIR and RXIR are on port B. Further, as shown in FIG. 1, the pins of each pair advantageously are adjacent for the simplification of board layout.

Referring to FIG. 3, depicted is a partial schematic block diagram of a system adapted for infrared (IR) communications with another system (not shown) having similar IR communications capabilities. The system having infrared communications capabilities comprises a universal asynchronous receiver-transmitter (UART), an infrared transmitter and receiver, and the present invention comprising functional pathways to a logic circuit, and an encode circuit and a decode circuit. The functional pathways, according to an exemplary embodiment of the invention, comprise an encode TX function input and TXIR output, a decode RXIR function input and RX function output, logic BAUD 2:0 function inputs, a logic MODE function input, and a logic RESET function input. Not illustrated but contemplated and within the scope of the present invention is a logic EN function input, an OSC1/CLKIN function input/output, an OSC2 function input/output and power supply VDD and VSS function inputs (see FIG. 1).

The TX functional pathway is adapted for coupling to a serial data output of the UART. The TXIR functional pathway is adapted for coupling to an IR transmitter. The RX functional pathway is adapted for coupling to a serial data input of the UART. The RXIR functional pathway is adapted for coupling to an IR receiver. The IR receiver may have a logic level output or may only be an IR detector having a low level analog output. The BAUD 2:0 functional pathways are adapted for coupling to logic levels that define a hardware baud rate. The MODE functional pathway is adapted for coupling to a logic level used for selection of either hardware (BAUD 2:0) or software baud rate control. The RESET functional pathway is adapted for coupling to a logic level for controlling a reset function of the logic circuits (e.g., microcontroller). The EN functional pathway (FIG. 1) is adapted for coupling to a logic level for controlling an operation or sleep mode of the logic circuits for power reduction when not in use. The OSC1/CLKIN functional pathway is adapted for coupling to a system clock or one node of a frequency determining element such as a crystal. The OSC2 functional pathway is adapted for coupling to the other node of the frequency determining element or as an oscillator/clock output. The VDD and VSS functional pathways are adapted for coupling to power supply voltages required to operate the devices in the system.

Exemplary embodiments of systems and devices having the aforementioned functional pathways arranged as claimed herein are illustrated in co-pending U.S. patent application Ser. No. 09/862,079, entitled "Infrared Encoder/Decoder Having Hardware and Software Data Rate Selection" by Steven Eric Schlanger, filed May. 21, 2001, an is incorporated herein by reference for all purposes.

The present invention has been described in terms of exemplary embodiments. In accordance with the present invention, the parameters for a system may be varied, typically with a design engineer specifying and selecting them for the desired application. Further, it is contemplated that other embodiments, which may be devised readily by persons of ordinary skill in the art based on the teachings set forth herein, may be within the scope of the invention, which is defined by the appended claims. The present invention may be modified and practiced in different but equivalent manners that will be apparent to those skilled in the art having the benefit of the teachings set forth herein.

No limitations are intended to the details or construction or design shown herein, other than as described in the claims appended hereto. Thus, it should be clear that the specific embodiments disclosed above may be altered and modified, and that all such variations and modifications are within the spirit and scope of the present invention as set forth in the claims appended hereto.

What is claimed is:

1. An integrated circuit (IC) having a functional pathway configuration of 14 connections, comprising:
   a positive supply voltage (VDD) input for logic circuits of the integrated circuit (IC);
   a ground reference (VSS) input for the logic circuits of the IC;
   an oscillator crystal/external clock source (OSC1/CLKIN) input;
   an oscillator crystal (OSC2) output;
   a reset (RESET) input;
   an asynchronous receive (RXIR) input from an IrDA transceiver;
   an asynchronous transmit (TXIR) output to the IrDA transceiver;
   a mode select (MODE) input;
   an enable (EN) input;
   an asynchronous serial (TX) input from a controller serial communications interface;
   an asynchronous serial (RX) output to the controller serial communications interface;
   a first baud rate selection (BAUD0) input;
   a second baud rate selection (BAUD1) input; and
   a third baud rate selection (BAUD2) input.

2. The IC functional pathway configuration according to claim 1, wherein the connections of a dual inline IC are arranged as follows:
   pin 1 is the VDD input;
   pin 2 is the OSC1/CLKIN input;
   pin 3 is the OSC2 output;
   pin 4 is the RESET input;
   pin 5 is the RXIR input;
   pin 6 is the TXIR output;
   pin 7 is the MODE input;
   pin 8 is the BAUD2 input;
   pin 9 is the BAUD1 input;
   pin 10 is the BAUD0 input;
   pin 11 is the RX output;
   pin 12 is the TX input;
   pin 13 is the EN input; and
   pin 14 is the VSS input.

3. An integrated circuit (IC) having a functional pathway configuration for an interface between the IC and a system in which the IC is embedded, comprising:
   a positive supply voltage (VDD) input for logic circuits;
   a ground reference (VSS) input for the logic circuits;
   an oscillator crystal/external clock source (OSC1/CLKIN) input;
   an oscillator crystal (OSC2) output;
   a reset (RESET) input;
   an asynchronous receive (RXIR) input from an IrDA transceiver;
   an asynchronous transmit (TXIR) output to the IrDA transceiver;
   a mode select (MODE) input;
   an enable (EN) input;
   an asynchronous serial (TX) input from a controller serial communications interface;
   an asynchronous serial (RX) output to the controller serial communications interface;
   a first baud rate selection (BAUD0) input;
   a second baud rate selection (BAUD1) input; and
   a third baud rate selection (BAUD2) input.

4. An integrated circuit (IC) having a functional pathway configuration for encode/decode functions and logic circuits, said IC comprising:
- an encode circuit having an asynchronous serial (TX) input from a controller serial communications interface and an asynchronous transmit (TXIR) output to an IrDA transceiver;
- a logic circuit having a mode select (MODE) input, a reset (RESET) input, a first baud rate selection (BAUD0) input, a second baud rate selection (BAUD1) input and a third baud rate selection (BAUD2) input; and
- a decode circuit having an asynchronous receive (RXIR) input from the IrDA transceiver input and an asynchronous serial (RX) output to the controller serial communications interface.

5. The IC according to claim 4, wherein pathway configuration function connections are arranged as follows:
- a first connection P1 consisting of a positive supply voltage (VDD) input for logic and input-output (I/O) circuits;
- a second connection P2 consisting of the OSC1/CLKIN input;
- a third connection P3 consisting of the OSC2 output;
- a fourth connection P4 consisting of the RESET input;
- a fifth connection P5 consisting of the RXIR input;
- a sixth connection P6 consisting of the TXIR output;
- a seventh connection P7 consisting of the MODE input;
- an eighth connection P8 consisting of the BAUD2 input;
- a ninth connection P9 consisting of the BAUD1 input;
- a tenth connection P10 consisting of the BAUD0 input;
- an eleventh connection P11 consisting of the RX output;
- a twelfth connection P12 consisting of the TX input;
- a thirteenth connection P13 consisting of an enable (EN) input; and
- a fourteenth connection P14 consisting of a ground reference (VSS) input for the logic and I/O circuits.

6. An integrated circuit (IC) having a functional pathway configuration for an encoder/decoder, comprising:
- a first set of seven connections, wherein each of the first set of seven connections has a dedicated function(s) as follows:
  - a first connection P1 of the first set of seven connections has a function of a positive supply voltage (VDD) input for logic and input-output (I/O) circuits,
  - a second connection P2 of the first set of seven connections has functions of an oscillator crystal/external clock source (OSC1/CLKIN) input,
  - a third connection P3 of the first set of seven connections has a function of an oscillator crystal (OSC2) output,
  - a fourth connection P4 of the first set of seven connections has a function of a reset (RESET) input,
  - a fifth connection P5 of the first set of seven connections has a function of an asynchronous receive (RXIR) input from an IrDA transceiver,
  - a sixth connection P6 of the first set of seven connections has a function of an asynchronous transmit (TXIR) output to the IrDA transciever, and
  - a seventh connection P7 of the first set of seven connections has a function of a mode select (MODE) input; and
- a second set of seven connections, wherein each of the second set of seven connections has a dedicated function(s) as follows:
  - an eighth connection P8 of the second set of seven connections has a function of a third baud rate selection (BAUD2) input,
  - a ninth connection P9 of the second set of seven connections has a function of a second baud rate selection (BAUD1) input,
  - a tenth connection P10 of the second set of seven connections has a function of a first baud rate selection (BAUD0) input,
  - an eleventh connection P11 of the second set of seven connections has a function of an asynchronous serial (RX) output to a controller serial communications interface,
  - a twelfth connection P12 of the second set of seven connections has a function of an asynchronous serial (TX) input from the controller serial communications interface,
  - a thirteenth connection P13 of the second set of seven connections has a function of an enable (EN) input, and
  - a fourteenth connection P14 of the second set of seven connections has a function of a ground reference (VSS) input for the logic and I/O circuits;

wherein at least one of the sets of seven connections is disposed on one side of an integrated circuit package.

7. A functional pathway configuration in an electronic system for interfacing between a universal asynchronous receiver-transmitter (UART), an infrared transmitter and receiver, and an integrated circuit (IC) embedded in the electronic system, the functional pathway configuration of the IC comprising:
- an encode circuit having an asynchronous serial (TX) input coupled to a universal asynchronous receiver-transmitter (UART) output and an asynchronous transmit (TXIR) output coupled to an infrared transmitter input;
- a decode circuit having an asynchronous receive (RXIR) input coupled to an infrared receiver output and an asynchronous serial (RX) output coupled to an input of the UART; and
- a logic circuit having a mode select (MODE) input, a reset (RESET) input, a first baud rate selection (BAUD0) input, a second baud rate selection (BAUD1) input and a third baud rate selection (BAUD2) input, wherein the logic circuit is coupled to the encoder circuit, the decoder circuit and the UART.

8. The functional pathway configuration in the electronic system according to claim 7, wherein the IC pathway configuration function connections are arranged as follows:
- a first connection P1 has a function of a positive supply voltage (VDD) input;
- a second connection P2 has functions of an oscillator crystal/external clock source (OSC1/CLKIN) input;
- a third connection P3 has a function of an oscillator crystal (OSC2) output;
- a fourth connection P4 has a function of the RESET input;
- a fifth connection P5 has a function of the RXIR input;
- a sixth connection P6 has a function of the TXIR output;
- a seventh connection P7 has a function of the MODE input;
- an eighth connection P8 has a function of the BAUD2 input;
- a ninth connection P9 has a function of the BAUD1 input;
- a tenth connection P10 has a function of the BAUD0 input;
- an eleventh connection P11 has a function of the RX output;

a twelfth connection P12 has a function of the TX input;
a thirteenth connection P13 has a function of an enable (EN) input; and
a fourteenth connection P14 has a function of a ground reference (VSS) input.

9. The functional pathway configuration in the electronic system according to claim 8, further comprising:
a first set of seven connections, wherein each of the first set of seven connections has a dedicated function(s) as follows:
the first set of seven connections has
the first connection P1 has the function of VDD,
the second connection P2 has the functions of OSC1/CLKIN,
the third connection P3 has the function of OSC2,
the fourth connection P4 has the function of RESET,
the fifth connection P5 has the function of RXIR,
the sixth connection P6 has the function of TXIR, and
the seventh connection P7 has the function of MODE; and
a second set of seven connections, wherein each of the second set of seven connections has a dedicated function(s) as follows:
the eighth connection P8 has the function of BAUD2,
the ninth connection P9 has the function of BAUD1,
the tenth connection P10 has the function of BAUD0,
the eleventh connection P11 has the function of RX,
the twelfth connection P12 has the function of TX,
the thirteenth connection P13 has the function of EN, and
the fourteenth connection P14 has the function of VSS;
wherein at least one of the sets of seven connections is disposed on one side of an integrated circuit package.

* * * * *